(12) United States Patent
Kress et al.

(10) Patent No.: US 8,898,764 B2
(45) Date of Patent: Nov. 25, 2014

(54) AUTHENTICATING USER THROUGH WEB EXTENSION USING TOKEN BASED AUTHENTICATION SCHEME

(71) Applicant: Microsoft Corporation, Redmond, WA (US)

(72) Inventors: Brian Kress, Redmond, WA (US); Andrew Salamatov, Seattle, WA (US); Matthias Leibmann, Woodinville, WA (US); Jason Henderson, Tacoma, WA (US)

(73) Assignee: Microsoft Corporation, Redmond, WA (US)

( * ) Notice: Subject to any disclaimer, the term of this patent is extended or adjusted under 35 U.S.C. 154(b) by 11 days.

(21) Appl. No.: 13/679,581

(22) Filed: Nov. 16, 2012

(65) Prior Publication Data
US 2013/0283362 A1    Oct. 24, 2013

Related U.S. Application Data

(60) Provisional application No. 61/635,404, filed on Apr. 19, 2012.

(51) Int. Cl.
*G06F 7/04*    (2006.01)

(52) U.S. Cl.
USPC .............................................. 726/7; 713/171

(58) Field of Classification Search
CPC ......... G06F 21/31; G06F 21/34; G06F 21/60; H04L 63/08; H04L 63/083; H04L 9/32; H04L 63/0861; H04L 63/0853; H04L 63/0428; H04L 63/0823; G06Q 20/341; G06Q 20/367; G07F 7/1008

USPC .......... 726/7, 19, 20, 4, 6, 9, 10, 28; 380/259, 380/279, 281, 282, 284; 709/217, 229; 713/155, 168, 171
See application file for complete search history.

(56) References Cited

U.S. PATENT DOCUMENTS

| | | | |
|---|---|---|---|
| 6,128,738 A * | 10/2000 | Doyle et al. | 713/185 |
| 6,892,307 B1 | 5/2005 | Wood et al. | |
| 7,174,383 B1 | 2/2007 | Biswas et al. | |
| 7,426,642 B2 | 9/2008 | Aupperle et al. | |
| 7,900,247 B2 * | 3/2011 | Chong | 726/10 |
| 7,987,366 B2 * | 7/2011 | Blom et al. | 713/171 |
| 8,387,150 B2 * | 2/2013 | Schnell | 726/26 |
| 2003/0149781 A1 | 8/2003 | Yared et al. | |
| 2003/0163733 A1 | 8/2003 | Barriga-Caceres et al. | |

(Continued)

OTHER PUBLICATIONS

Adida, Ben, "EmID: Web Authentication by Email Address", Retrieved at <<http://assets.adida.net/research/w2sp2008-emid.pdf>>, Proceedings of Web 2.0 Security and Privacy Workshop, May 22, 2008, pp. 6.

(Continued)

*Primary Examiner* — Abu Sholeman
(74) *Attorney, Agent, or Firm* — Tom Wong; Jim Ross; Micky Minhas (57) ABSTRACT

A web extension authenticates a user using a token based authentication scheme. A token is retrieved from a client application to authenticate the user. The web extension transmits the token to a server component to have the server component authenticate the user. The server component validates the token using a validation library. The user is mapped to the token and authenticated upon validating the token.

18 Claims, 6 Drawing Sheets

(56) References Cited

U.S. PATENT DOCUMENTS

| | | | |
|---|---|---|---|
| 2007/0186103 A1* | 8/2007 | Randle et al. | 713/168 |
| 2008/0015927 A1* | 1/2008 | Ramirez | 705/10 |
| 2009/0013394 A1 | 1/2009 | Marcus et al. | |
| 2009/0077655 A1* | 3/2009 | Sermersheim et al. | 726/20 |
| 2009/0144407 A1* | 6/2009 | Jeong et al. | 709/223 |
| 2009/0177770 A1* | 7/2009 | Jeong et al. | 709/224 |
| 2009/0228988 A1* | 9/2009 | Jeong et al. | 726/27 |
| 2009/0313349 A1* | 12/2009 | Jeong et al. | 709/217 |
| 2009/0313502 A1* | 12/2009 | Jeong et al. | 714/18 |
| 2009/0328228 A1* | 12/2009 | Schnell | 726/26 |
| 2010/0268805 A1* | 10/2010 | Jeong et al. | 709/223 |
| 2011/0060800 A1* | 3/2011 | Cohen et al. | 709/206 |
| 2011/0219230 A1* | 9/2011 | Oberheide et al. | 713/168 |
| 2011/0307622 A1* | 12/2011 | Williams | 709/229 |
| 2012/0066386 A1 | 3/2012 | McGowan et al. | 709/225 |
| 2012/0174198 A1* | 7/2012 | Gould et al. | 726/6 |
| 2012/0198240 A1* | 8/2012 | Tie et al. | 713/176 |
| 2012/0216268 A1* | 8/2012 | Kassaei et al. | 726/9 |
| 2012/0246705 A1* | 9/2012 | Brown et al. | 726/4 |
| 2012/0291062 A1* | 11/2012 | Pearson et al. | 725/31 |
| 2012/0291089 A1* | 11/2012 | Bomgardner et al. | 726/1 |
| 2013/0007845 A1* | 1/2013 | Chang et al. | 726/4 |
| 2013/0074158 A1* | 3/2013 | Koskimies et al. | 726/4 |
| 2013/0110676 A1* | 5/2013 | Kobres | 705/26.41 |
| 2013/0145474 A1* | 6/2013 | Mergi et al. | 726/26 |
| 2013/0152180 A1* | 6/2013 | Nair et al. | 726/6 |
| 2013/0212663 A1* | 8/2013 | Edge et al. | 726/7 |
| 2013/0212695 A1* | 8/2013 | Schnell | 726/26 |
| 2013/0247155 A1* | 9/2013 | Boulos et al. | 726/4 |
| 2013/0283354 A1* | 10/2013 | Garg et al. | 726/4 |
| 2014/0020077 A1* | 1/2014 | Court et al. | 726/8 |
| 2014/0052986 A1* | 2/2014 | Kanai et al. | 713/168 |
| 2014/0101718 A1* | 4/2014 | Blinn et al. | 726/1 |
| 2014/0101784 A1* | 4/2014 | Shukla et al. | 726/30 |
| 2014/0164774 A1* | 6/2014 | Nord et al. | 713/171 |
| 2014/0173711 A1* | 6/2014 | Zlatarev | 726/8 |
| 2014/0173755 A1* | 6/2014 | Wahl | 726/28 |
| 2014/0181948 A1* | 6/2014 | Mazur et al. | 726/9 |
| 2014/0189134 A1* | 7/2014 | Das | 709/227 |

OTHER PUBLICATIONS

Obasanjo, Dare, "Windows Live developer platform adds OAuth 2.0 and more, continuing to let users connect the devices, apps, and sites they choose", Retrieved at <<http://windowsteamblog.com/windows_live/b/windowslive/archive/2011/06/14/windows-live-developer-platform-adds-oauth-2-0-and-more-continuing-to-let-users-connect-the-devices-apps-and-sites-they-choose.aspx>>, Jun. 14, 2011, pp. 12.

Marasco, et al., "WebFacing and Single Sign-on: Exploiting Identity Tokens in Multi-Tier Web Applications", Retrieved at <<http://www.redbooks.ibm.com/redpapers/pdfs/redp4081.pdf>>, Published in IBM Redpaper, Feb. 23, 2006, pp. 84.

* cited by examiner

AUTHENTICATING USER THROUGH WEB EXTENSION USING TOKEN BASED AUTHENTICATION SCHEME

CROSS REFERENCE TO RELATED APPLICATIONS

This application claims the benefit of U.S. Provisional Patent Application Ser. No. 61/635,404 filed on Apr. 19, 2012. The disclosures of the provisional patent application are hereby incorporated by reference for all purposes.

BACKGROUND

External tools expand longevity of legacy solutions. Integrated tools can enable an existing application to provide new functionality. An existing solution lacking modern functionality can add modern features through integrated tools. However, most third party tool solutions are custom developed and lack flexibility. Most legacy applications rarely provide standardized interfaces to integrate external tools. Vendors develop custom solutions to integrate external tools for inflexible legacy applications at great cost to a customer. Custom solutions are rarely portable or upgradeable. In addition, a typical vendor developing external tools spends significant resources to maintain in house legacy knowledge base. Legacy knowledge bases depreciate at alarming speed with each new product cycle and change in the technology.

User authentication schemes rarely work well across external tools and legacy applications. A user seeking access to protected resources in a legacy application is usually forced to authenticate separately for the external tool and the legacy application. The user is forced to break flow of a work process and provide duplicate credentials through multiple log-in processes. In addition, privileges usually do not propagate from the legacy application to the external tool. External tools can be forced to implement expansive and exotic authentication schemes to gain privileges to access protected resources of the legacy application. Forcing the user to manage multiple credentials for a single task complicates user productivity.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to authenticating a user through a web extension using a token based authentication scheme. According to some embodiments, a web extension may retrieve a token from a client to authenticate a user. The token may be a user identity token containing attributes about a user. The web extension may transmit the token to a server component to authenticate the user. The server component of the web extension may be web service. The server component may validate the token. Validation may include verification of a unique user identifier contained in the token using a validation library. The server component may map the user to the token and authenticate the user upon validating the token.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a web extension may authenticate a user using a token based authentication scheme. The web extension may retrieve a token from a client application to authenticate the user. The web extension may transmit the token to its server component to authenticate the user. The server component may map the user to the token and authenticate the user upon validating the token.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for authenticating a user through a web extension using a token based authentication scheme. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
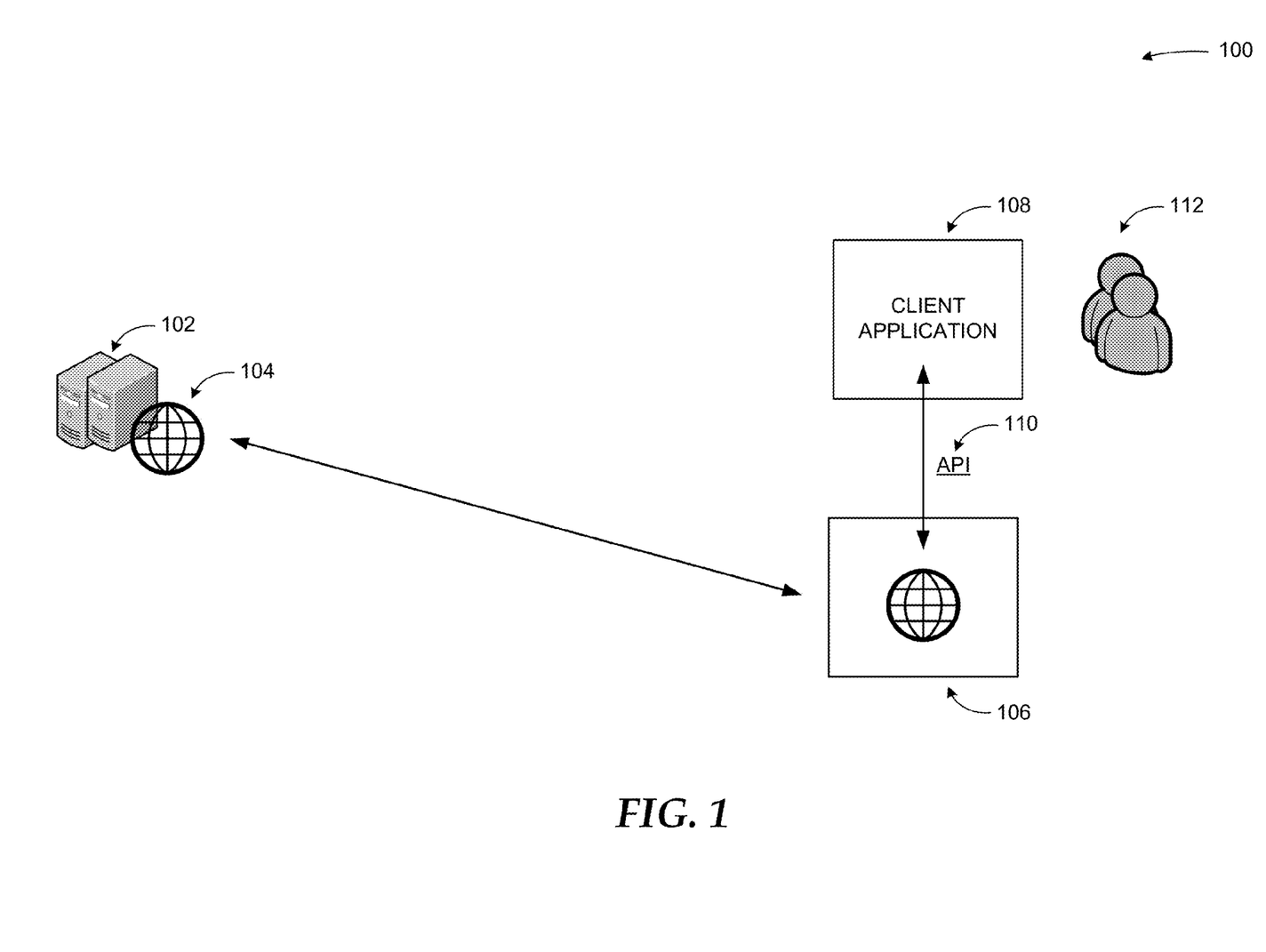
FIG. 1 illustrates an example architecture diagram where a web extension may authenticate a user using a token based authentication scheme according to some embodiments.

FIG. 1 illustrates an example architecture diagram where a web extension may authenticate a user using a token based authentication scheme according to embodiments. The components and environments shown in diagram 100 are for illustration purposes. Embodiments may be implemented in various local, networked, cloud-based and similar computing environments employing a variety of computing devices and systems, hardware and software.

A web extension 106 may authenticate a user 112 attempting to access protected resources of a client application 108 through the web extension 106. The user may initiate the web extension 106 in the client application 108 to perform added functionality provided by the web extension 106. The added functionality may attempt to access protected resources in the client application 108. The client application 108 may demand the web extension 106 to authenticate the user 112.

The web extension may communicate with the client using an application programming interface (API) 110 to request a token. The token may contain identifier information about the user. The token may be transmitted to a server component 104 of the web extension at a server 102 to authenticate the user. The server component 104 such as a web service may validate the token and authenticate the user in server 102. The web extension 106 may communicate with the server component 104 using any standard or proprietary format and communication protocol, for example, extensible markup language (XML) formatted hypertext transport protocol (HTTP) or even binary.

Embodiments are not limited to implementation in a client-server type architecture. A web extension may authenticate a user using a token based authentication scheme in a peer-to-peer, distributed, cloud based, and combination type architecture. In an example scenario, the web extension may implement client and server components entirely in a client device while merging server and client functionality.

Some embodiments enable a server component and a client application to use different identity providers for their user population to sign-on, and provide a mechanism to securely link the same user of both systems. A conventional server component would have to also integrate with the identity provider of the client, which may be a substantial change for the server component. Thus, a client and a server component may have separate identity providers to provide logon to their users.

Figure 2:
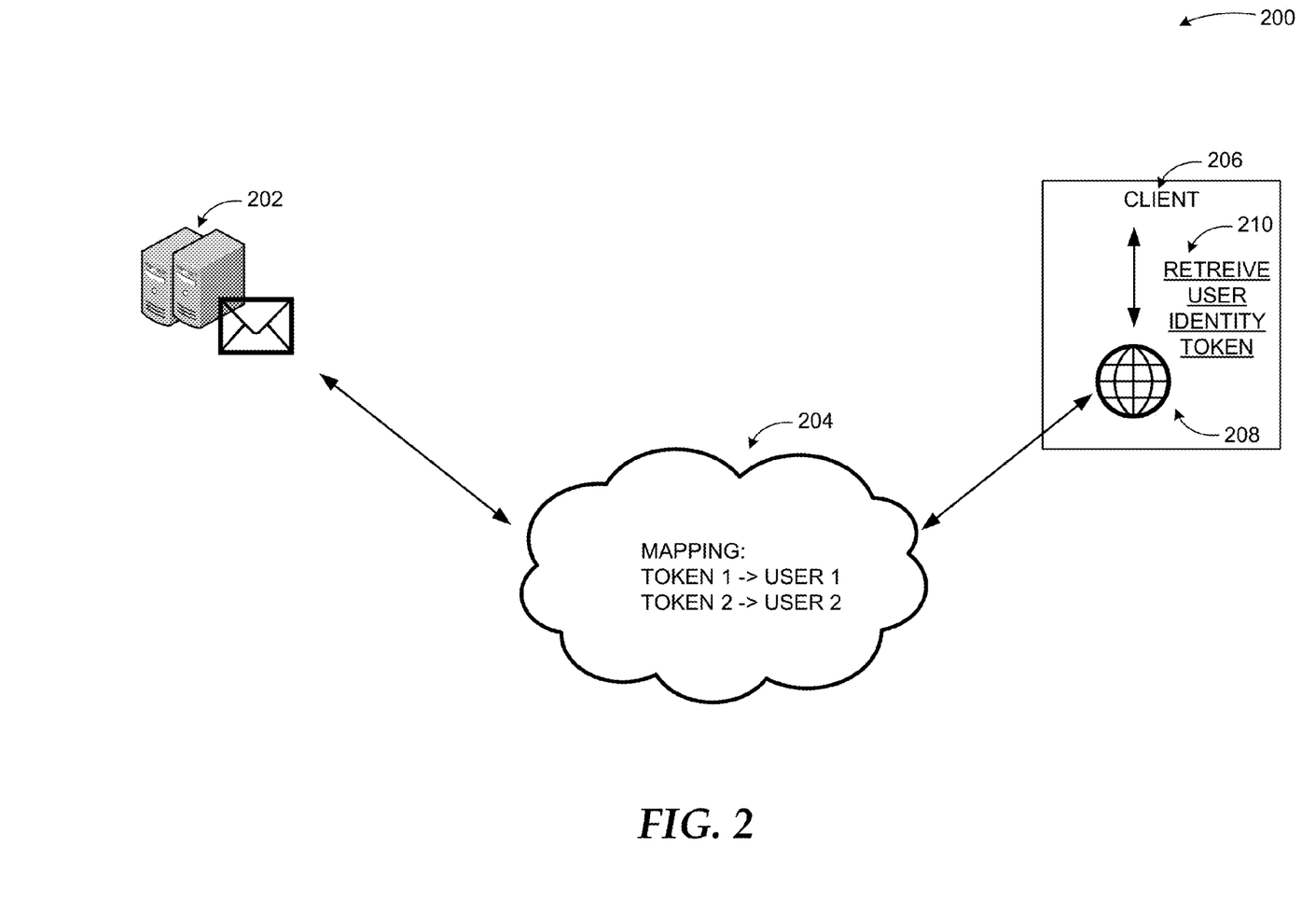
FIG. 2 illustrates a detailed architecture diagram of authenticating a user through a web extension using a token based authentication scheme according to embodiments.

FIG. 2 illustrates a detailed architecture diagram of authenticating a user through a web extension using a token based authentication scheme according to embodiments. Diagram 200 displays an authentication scheme managed by the web extension to authenticate the user while accessing protected resources.

When a user initiates a web extension 208 to interact with a client application 206, the client application may demand the web extension 208 to authenticate the user. The web extension 208 may retrieve a token identifying the user 210 from the client application. The web extension may determine a unique user identifier in the token. A signature may be determined in the token signed with a certificate from a server 202. A formatting using a script object notation standard or any other form may be detected in the token. In addition, the token may not be encrypted. The token may be determined in an unencrypted state to simplify the authentication scheme by avoiding complex encryption methodologies.

The web extension may transmit the token to a server component 204 of the web extension 208 to authenticate the token. The server component 204 may be a web service. The server component 204 may validate the token automatically using a validation library (i.e.: validation API). The server component may also validate the token manually by retrieving a public key from a server 202 hosting public keys.

Upon validating the token, the server component may extract the unique user identifier from the token. The server component may authenticate the user using the unique user identifier. If the unique user identifier is not found, the server component may request the web extension to prompt the user to log in and provide credentials. When the user provides credentials to the web extension, the web extension may transmit the credentials to the server component.

The server component may verify the user by matching the credentials to a set of registered users. If the server component cannot locate the user, the server component may notify the user that the credentials were not matched. If the server component matches the credentials to the set of registered users, the server component may create a mapping for the user and the token by using a uniform resource locator (URL) of a public or a private key used to sign the token. Next, the server component may inform the web extension 208 that the token was accepted and the user was authenticated.

A client application according to embodiments may create a token that has specific information that can be used to create an application-specific unique identifier for a user that the server component uses to create a unique tuple of {user-id; client-id} for connecting and later matching a connected user. In one example, the client-id may be the URL of where the key material is distributed to validate the token. In another example, the client component (that creates the token) may use either the native to the client user identifier (e.g. e-mail address) or create a unique hash using information from the server component that is registered in the client application, thus not providing even the user's identifier in the client application.

The authentication scheme may be optimized by caching a public key retrieved for authenticating the token for an extended predetermined time. If validation with the public key fails then the server component may retrieve a new public key at a URL associated with the public key.

In addition, a token may be valid for a predetermined time. Server component may avoid validating the token during the predetermined time, treat the token as a cookie or cache the token. Furthermore, single sign-on based user authentication may also be supported by using the token to authenticate the user interacting with the web extension.

In some examples, the token indicates that the user can trust that the URL where they fetched the public key (the URL which is signed into the token) is the same as one who signed it and represents the partner hosting system on the other end. It can also be assumed that the service performed its duty authenticating the user on its end. If the user is moved to another related system (e.g., from on-premise to cloud in a hybrid tenant), they may keep the same "user id" but the URL where to fetch the public key may change (e.g., to the cloud service).

Once the mapping is established, a user does not need to provide credentials for the same application across multiple devices. As long as it is the same application and the same user, the authentication may work regardless of which computing device the application is active on.

Figure 3:
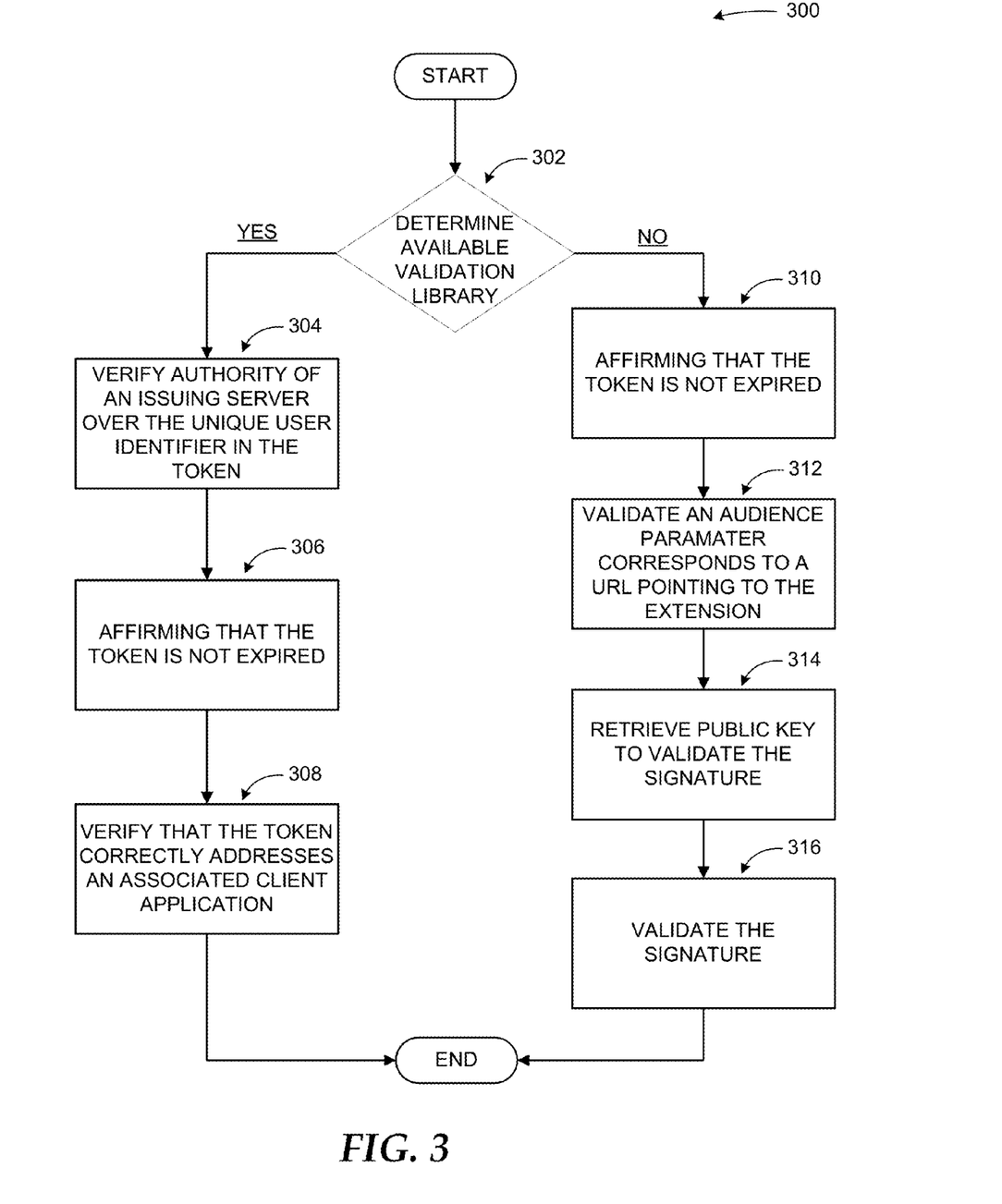
FIG. 3 illustrates a flow diagram describing validation of a token according to embodiments.

FIG. 3 illustrates a flow diagram describing validation of a token according to embodiments. Diagram 300 displays a validation scheme using a validation library or a public key based manual scheme.

A server component may determine an availability of a validation library after receiving the token to authenticate the user. If the server component determines the availability of the validation library, the server component may verify authority of an issuing server over the unique user identifier in the token. The server component may affirm that the token is not expired. Next, the server component may verify that the token correctly addresses an associated client application.

If the server component may determine an unavailability of the validation library, the server component may affirm that the token is not expired. Next, the server component may validate that an audience parameter of the token corresponds to an URL pointing to the web extension. The server component may also retrieve a public key to validate a signature of the token. The token may be validated using the signature by determining a validity of a certificate encompassing the signature.

The example scenarios and schemas in FIG. 2 through 3 are shown with specific components, data types, and configurations. Embodiments are not limited to systems according to these example configurations. Authenticating a user through a web extension using a token based authentication scheme may be implemented in configurations employing fewer or additional components in applications and user interfaces. Furthermore, the example schema and components shown in FIG. 2 through 3 and their subcomponents may be implemented in a similar manner with other values using the principles described herein. In addition, specific formatting, protocol, and schema examples are discussed for illustration purposes. Embodiments may be implemented using any suitable formatting, communication protocol, schema standards.

Figure 4:
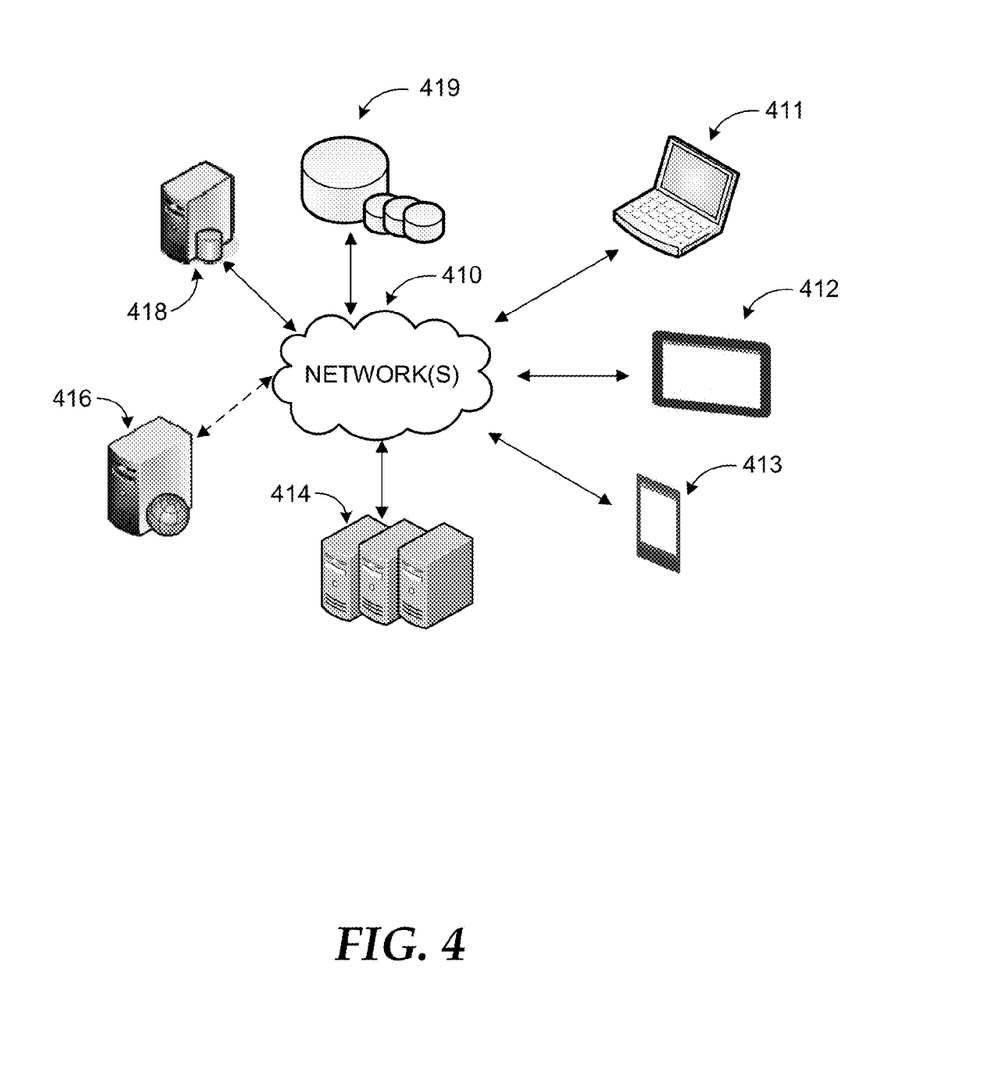
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application may execute on individual computing devices such as a smart phone 413, a tablet device 412, or a laptop computer 411 ('client devices') and communicate with customer and product information providers through network(s) 410.

As discussed above, a web extension may authenticate a user using a token based authentication scheme. A web extension may retrieve a token from a client application to authenticate the user. The token may be transmitted to a server component which may validate the token in order to authenticate the user. The user may be mapped to the token and authenticated upon validation. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to authenticate a user through a web extension using a token based authentication scheme. Furthermore, the networked environments discussed in FIG. 4 are for illustration purposes only. Embodiments are not limited to the example applications, modules, or processes.

Figure 5:
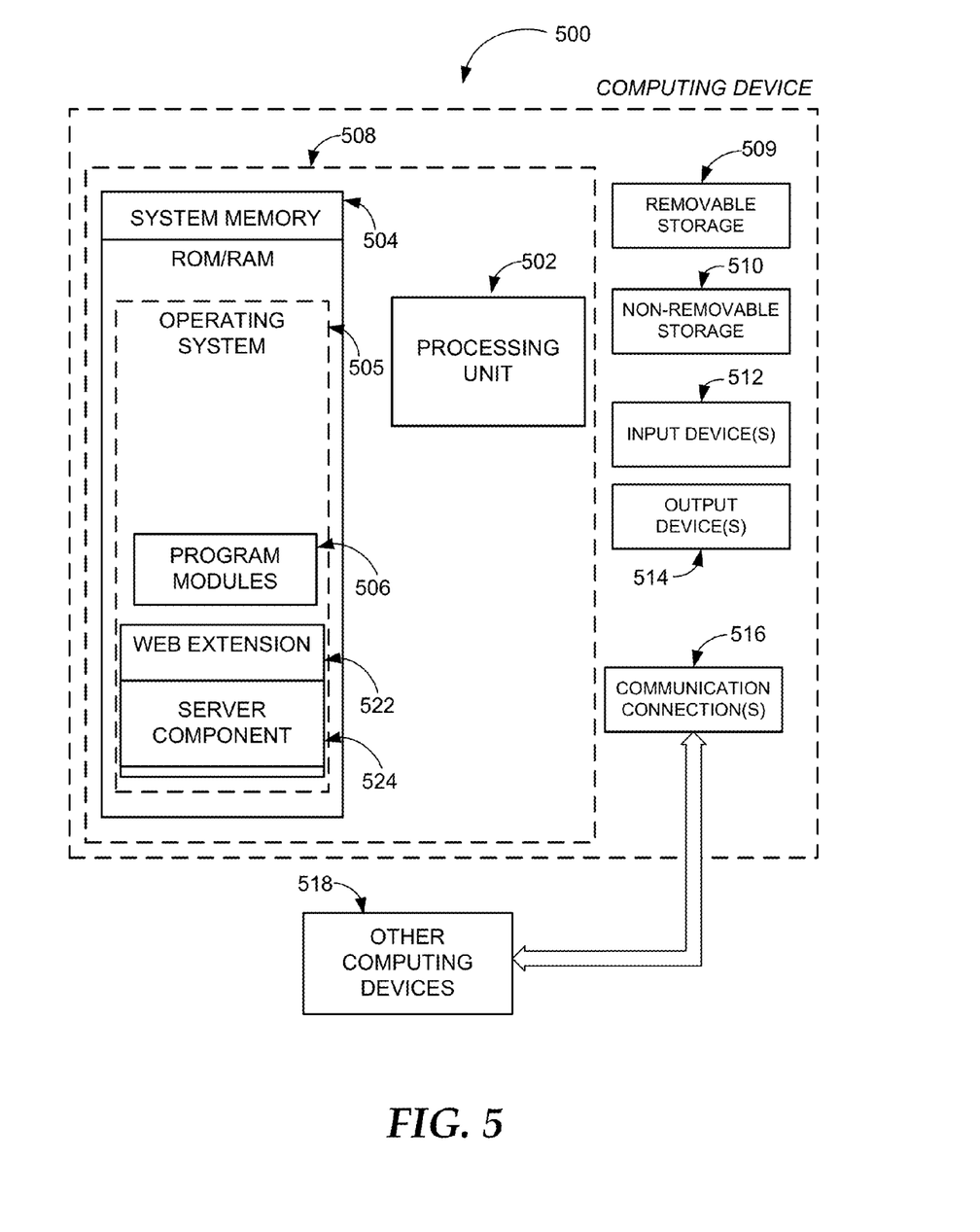
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® and WINDOWS PHONE® operating systems from MICROSOFT CORPORATION of Redmond, Wash. The system memory 504 may also include one or more software applications such as program modules 506, a web extension 522, and a server component 524.

An application may use the web extension 522 to authenticate the user using a token based authentication scheme according to embodiments. The web extension 522 may transmit a token retrieved from the client application to a server component to authenticate the user. The server component 524 may validate the token, map the user to the token, and authenticate the user. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
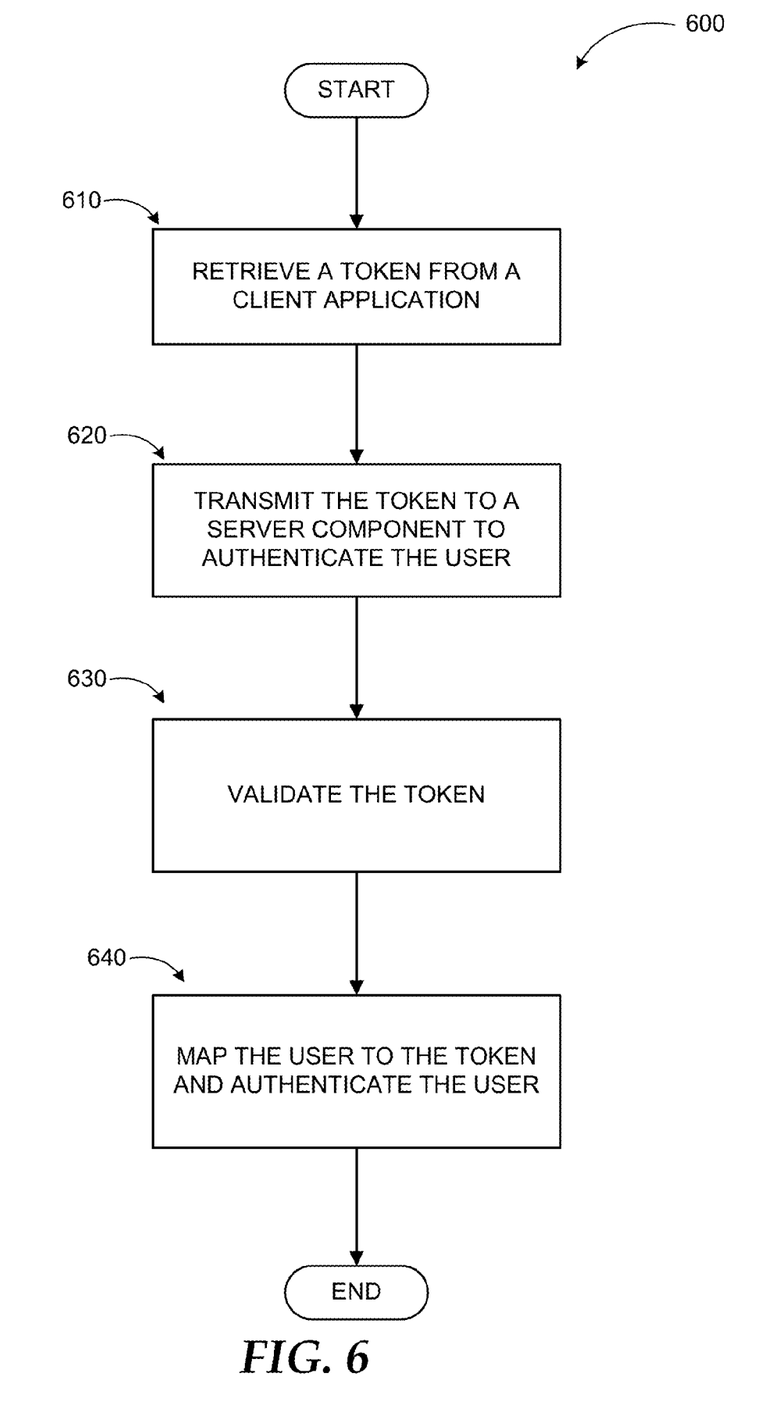
FIG. 6 illustrates a logic flow diagram for a process authenticating a user through a web extension using a token based authentication scheme according to embodiments.

FIG. 6 illustrates a logic flow diagram for a process authenticating a user through a web extension using a token based authentication scheme according to embodiments. Process 600 may be implemented by an application in some examples.

Process 600 may begin with operation 610 where the web extension may retrieve a token from a client application to authenticate a user. The token may include a unique user identifier associated with the user. The token may be transmitted to a server component to authenticate the user at operation 620. The server component may request the web extension to prompt the user to provide credentials if the unique user identifier specifies an unknown user. At operation 630, the server component may validate the token. The token may be validated using a validation library or a public key based manual validation scheme. Next, the server component may map the user to the token and authenticate the user at operation 640.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Authenticating a user through a web extension using a token based authentication scheme, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for authenticating a user through a web extension using a token based authentication scheme, the method comprising:
   receiving a token associated with the user at a client component of the web extension;
   transmitting the token to a server component of the web extension to authenticate the user;
   validating the token at the server component of the web extension;
   mapping the user to the token and authenticating the user at the server component of the web extension;
   determining an availability of a validation library to authenticate the user and the token for an automated validation at the server component;
   affirming that the token is not expired at the server component; and
   verifying that the token correctly addresses an associated client application, at the server component.

2. The method of claim 1, further comprising:
   detecting a user identifier associated with the user in the token; and
   determining a signature in the token from a server having authority over the user identifier.

3. The method of claim 1, wherein the client component and the server component have separate identity providers to provide logon to their users.

4. The method of claim 1, further comprising:
   enabling a single sign-on for the associated client application across multiple computing devices without requesting user credentials on each computing device.

5. The method of claim 1, further comprising:
   receiving the token in an unencrypted state.

6. The method of claim 1, further comprising:
   validating the token by using a public key for a manual validation.

7. The method of claim 1, further comprising:
   extracting a user identifier from the token.

8. The method of claim 7, further comprising:
   authenticating the user by matching the user identifier to a set of registered users.

9. The method of claim 7, further comprising:
   requesting the client component of the web extension to prompt the user to provide credentials upon an inability to extract the user identifier from the token.

10. The method of claim 9, further comprising:
    receiving the credentials at the server component of the web extension; verifying the user by matching the credentials to a set of registered users;
    notifying the user of an inability to match the credentials upon a failure to locate the user; and
    mapping the user to the token by using a uniform resource locator (URL) of a public key used to sign the token upon matching the credentials to the set of registered users.

11. A web server for authenticating a user through a web extension using a token based authentication scheme, the web server comprising:
- a memory configured to store instructions; and
- a processor coupled to the memory, the processor executing an application in conjunction with the instructions stored in the memory, wherein the application is configured to:
  - receive a token associated with the user at a client component of the web extension;
  - transmit the token to a server component of the web extension to authenticate the user;
  - detect a user identifier associated with the user in the token at the server component of the web extension;
  - validate the token at the server component of the web extension by matching the user identifier to a set of registered users;
  - map the user to the token and authenticate the user at the server component of the web extension;
  - determine an availability of a validation library to authenticate the user at the server component;
  - verify authority of an issuing server over the user identifier in the token at the server component;
  - affirm that the token is not expired at the server component; and
  - verify that the token correctly addresses an associated client application, at the server component.

12. The web server of claim 11, wherein the application is further configured to:
- determine an unavailability of a validation library to authenticate the user.

13. The web server of claim 12, wherein the application is further configured to:
- validate that an audience parameter of the token corresponds to a uniform resource locator (URL) pointing to the web extension.

14. The web server of claim 13, wherein the application is further configured to:
- retrieve a public key to validate a signature of the token; and
- validate the signature.

15. A computer-readable memory device with instructions stored thereon for authenticating a user through a web extension using a token based authentication scheme, the instructions comprising:
- receiving a token associated with the user at a client component of the web extension; transmitting the token to a server component of the web extension to authenticate the user;
- detecting a user identifier associated with the user in the token at the server component of the web extension;
- determining a signature in the token from a server having authority over the user identifier at the server component of the web extension;
- validating the token at the server component of the web extension by: matching the user identifier to a set of registered users;
- validating the signature against the server by determining a validity of a certificate encompassing the signature;
- mapping the user to the token and authenticating the user at the server component of the web extension;
- determining an availability of a validation library to authenticate the user at the server component;
- affirming that the token is not expired at the server component; and
- verifying that the token correctly addresses an associated client application, at the server component.

16. The computer-readable memory device of claim 15, wherein the instructions further comprise:
- optimizing the authentication scheme by:
  - avoiding validation of the token during a predetermined time in which the token is valid; and
  - one of: treating the token as a cookie and caching the token.

17. The computer-readable memory device of claim 15, wherein the instructions further comprise:
- optimizing the authentication scheme by caching a retrieved public key to validate the token for an extended predetermined time.

18. The computer-readable memory device of claim 17, wherein the instructions further comprise:
- retrieving a new public key to validate the token upon a failure to validate the token with the public key.

* * * * *